US006652284B2

(12) United States Patent
August et al.

(10) Patent No.: US 6,652,284 B2
(45) Date of Patent: Nov. 25, 2003

(54) VIRTUAL ASSISTANT COACH

(75) Inventors: Katherine G. August, Matawan, NJ (US); Thomas W. Baker, Orefield, NJ (US); Anthony Botzas, Allentown, PA (US); Joseph M. Cannon, Harleysville, PA (US)

(73) Assignee: Agere Systems Inc., Miami Lakes, FL (US)

( * ) Notice: Subject to any disclaimer, the term of this patent is extended or adjusted under 35 U.S.C. 154(b) by 0 days.

(21) Appl. No.: 09/809,104

(22) Filed: Mar. 16, 2001

(65) Prior Publication Data
US 2002/0132211 A1 Sep. 19, 2002

(51) Int. Cl.[7] ................... A63B 69/00; G09B 19/00
(52) U.S. Cl. ................... 434/247; 473/266
(58) Field of Search ................... 434/247, 248, 434/249, 250, 251, 252, 253, 254; 463/1, 4; 473/131, 169, 407, 266

(56) References Cited

U.S. PATENT DOCUMENTS

| | | | | |
|---|---|---|---|---|
| 4,834,375 A | * | 5/1989 | Elstein | 473/417 X |
| 5,486,001 A | * | 1/1996 | Baker | 473/266 X |
| 5,507,485 A | * | 4/1996 | Fisher | 473/407 X |
| 5,554,033 A | * | 9/1996 | Bizzi et al. | 434/247 X |
| 5,727,950 A | * | 3/1998 | Cook et al. | 434/350 |
| 5,823,786 A | * | 10/1998 | Easterbrook | 434/247 X |
| 5,846,086 A | * | 12/1998 | Bizzi et al. | 434/247 X |
| 5,882,204 A | * | 3/1999 | Iannazo et al. | 434/251 X |
| 5,882,269 A | * | 3/1999 | Lewis | 473/407 X |
| 5,890,906 A | * | 4/1999 | Macri et al. | 434/247 X |
| 6,164,973 A | * | 12/2000 | Macri et al. | 434/247 X |
| 6,183,259 B1 | * | 2/2001 | Macri et al. | 434/247 X |
| 6,224,387 B1 | * | 5/2001 | Jones | 434/252 X |
| 6,287,125 B1 | * | 9/2001 | Dorcely | 434/323 X |
| 6,293,802 B1 | * | 9/2001 | Ahlgren | 434/252 X |
| 6,411,796 B1 | * | 6/2002 | Remschel | 434/350 X |
| 2002/0115046 A1 | * | 8/2002 | McNitt et al. | 434/252 |

* cited by examiner

Primary Examiner—S. Thomas Hughes
Assistant Examiner—Chanda Harris
(74) Attorney, Agent, or Firm—Dickstein Shapiro Morin & Oshinsky LLP

(57) ABSTRACT

A virtual coach is provided in the form of a master communications device and one or more player associated communications devices. The master communication device includes a processor which receives information on game play conditions and/or player and game object locations, analyzes the information, and formulates an appropriate coaching instruction which is transmitted to one or more selected players.

7 Claims, 14 Drawing Sheets

RX/TX TIMING IN MULTI-SLAVE CONFIGURATION

VIRTUAL ASSISTANT COACH

FIELD OF THE INVENTION

The present invention relates to a method and apparatus used as an aid in coaching game players, for example, soccer, football or baseball players, etc.

BACKGROUND OF THE INVENTION

Coaching sports teams, or sports individuals, involves teaching individuals how to position themselves and how to conduct themselves in different game play situations. Very often, for sports games involving many players, there are more players than available coaches during practice, or even during game play. While a coach can certainly talk to a group about general play, it is difficult to talk one-on-one with an individual with respect to details about his individual play. The effectiveness of coaching instruction is therefore limited by the number of available coaches.

BRIEF SUMMARY OF THE INVENTION

The present invention provides a virtual assistant coach which can provide more individualized instructions to each player during a practice session, or even during game play, thereby enhancing a player's training and ability to play.

The virtual assistant coach is provided as a processor driven system which provides coaching instructions to all or selected players individually at substantially the same time to facilitate better overall team performance during game play or practice sessions.

The virtual coach is in the form of a master communications device which is capable of wireless communications with another communications device which may be player wearable. The master communications device includes a processing unit, communications unit, input device and display. The processing unit receives and processes one or more of player statistics, game play information, and player location information, and develops for specific game play situations coaching instructions which are communicated to the player. The player listens to the coaching instructions and, hopefully, carries out those instructions during practice sessions or game play.

The master communications device can selectively communicate with individual players on respective communications channels which do not interfere with the communications channels assigned to other players.

The master communications device can also be operated in a manner which improves the quality of its coaching instruction by comparing actual results of a transmitted coaching instruction to expected results, and updating future coaching instructions based on the result of the comparison.

The master communications device may also provide a display of player locations on a virtual playing field for use in selecting a player for receiving coaching instructions from the master communications device, and for observations by a real coach of operation of the master communications device, as well as results achieved based on coaching instructions issued by the master communications device. The display may also indicate the location of a game play object such as a ball in relation to the displayed players.

These and other advantages and features of the invention will be more clearly understood from the following detailed description which is provided in connection with the accompanying drawings.

DETAILED DESCRIPTION OF THE INVENTION

The present invention will be described with relation to specific examples of how the invention may be implemented and used. These examples, however, are not exhaustive, as the invention may be applied to any sport or game which involves player coaching, each of which may have its own unique set of rules and coaching instructions. Accordingly, the invention is not to be considered as limited by the exemplary description below, as many modifications, substitutions and changes will become readily apparent to those skilled in the art.

Figure 1:
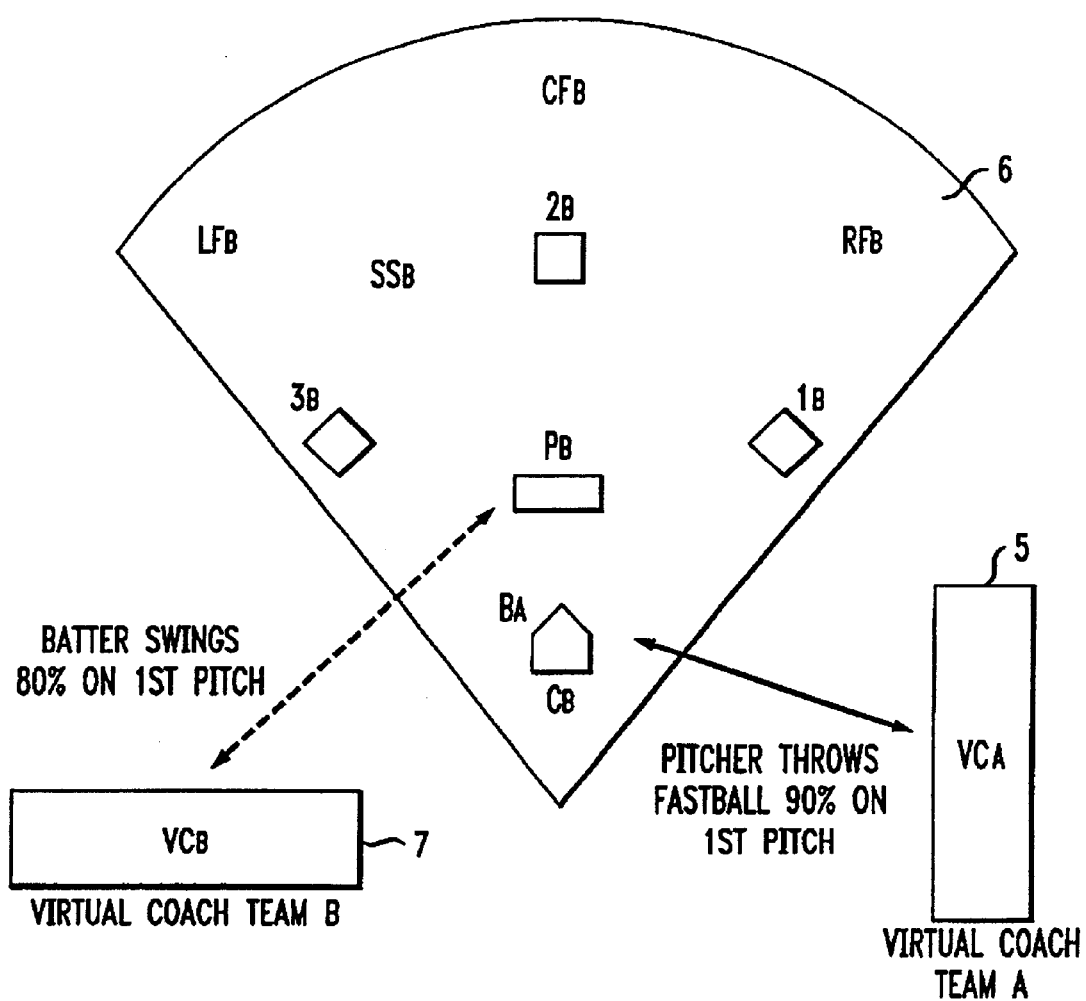
FIG. 1 illustrates application of the invention to coaching a baseball game.

Referring first to FIG. 1, it shows one exemplary use of the invention in the context of a baseball game. Baseball field 6 is illustrated as having thereon a batter $B_A$, and opposing players including a catcher $C_B$, pitcher $P_B$, first baseman $1_B$, second baseman $2_B$, shortstop $SS_B$, third baseman $3_B$, right fielder $RF_B$, center fielder $CF_B$, and left fielder $LF_B$.

Each of the illustrated players may have a wearable player communications device built into a helmet, glove or hat or otherwise provided on the player. As shown in FIG. 1, the batter $B_A$ is in communication with a virtual coach $VC_A$, and the pitcher is in communication with a virtual coach $VC_B$. As one exemplary environment, the pitcher may be receiving coaching instructions in the form of statistical information from virtual coach $VC_B$, such as "the batter swings 80% of the time on a first pitch."

The batter $B_A$ in turn receives coaching instructions from virtual coach $VC_A$ containing useful information, such as "the pitcher throws a fast ball 90% of the time on the first pitch." The virtual coach $VC_B$ may also be in communication with other selected players on the field, providing them with information with respect to hitting tendencies, characteristics of the batter $B_A$, or game situations to look out for.

While only a few coaching instructions have been described above as exemplary, it should be apparent that many different coaching instructions are available depending on individual players, the teams on which the players play, the stadium in which the game is being played, the current game conditions and player locations, and other factors. These can all be identified and quantified in a database provided at each of the virtual coaches $VC_A$ and $VC_B$ for use in selecting coaching instructions which are communicated to various ones of the players on the baseball field.

Figure 2:
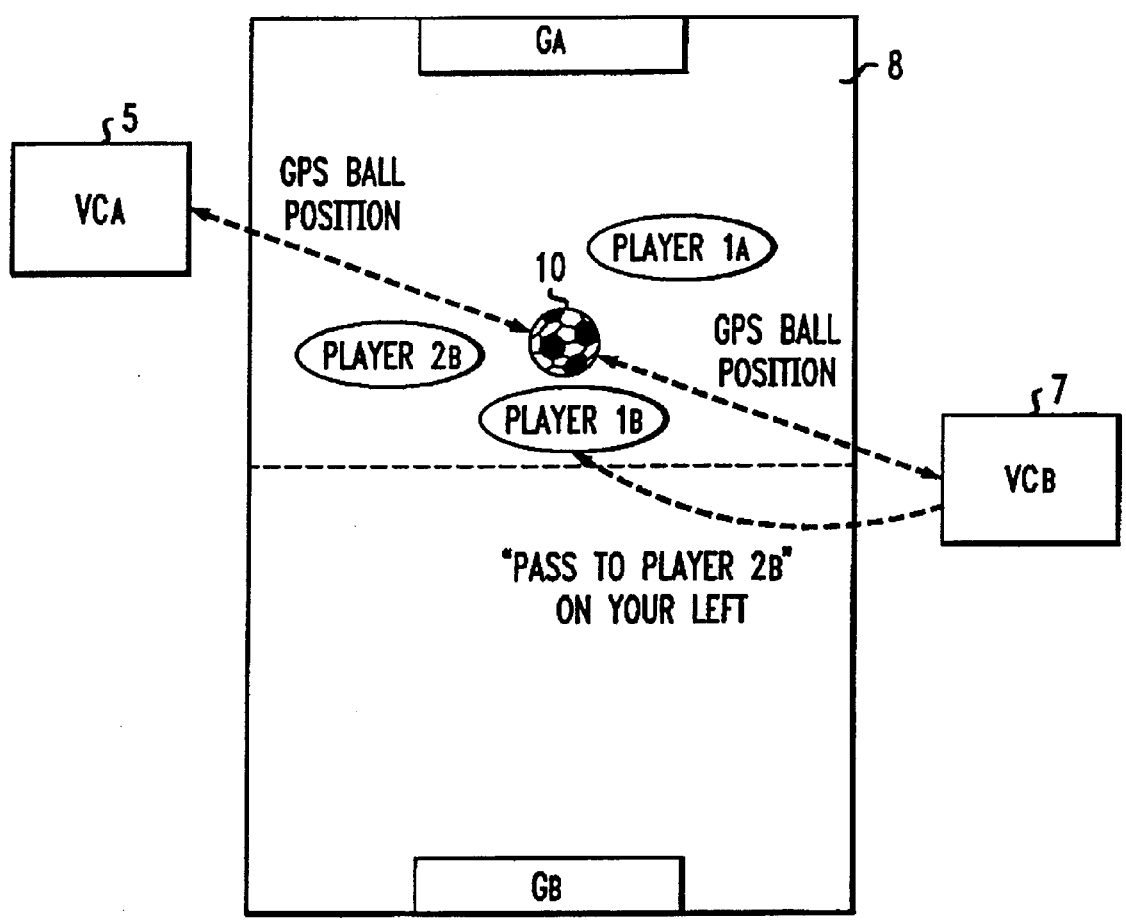
FIG. 2 illustrates application of the invention to coaching a soccer game.

FIG. 2 illustrates a second example of the use of a virtual coach of the invention, this time in connection with a soccer game. Here the game field is indicated as 8, and the respective goals as $G_A$ and $G_B$. In this instance, virtual coaches $VC_A$ and $VC_B$ receive information on player position (both offensive and defensive), and the ball 10 location. Based on information on where the players are situated relative to the ball, each of the virtual coaches $VC_A$ and $VC_B$ provides coaching instructions to their respective associated players. Thus, for example, virtual coach $VC_B$ may formulate a coaching instruction passed to player $1_B$ who currently has control of the ball 10 to "pass the ball to player $2_B$." The manner in which both player location and ball 10 location information is acquired by each of the virtual coaches $VC_A$ and $VC_B$ will be described in more detail below.

As noted, although FIGS. 1 and 2 showed two exemplary environments in which the invention may be used, the invention may actually be used with any sport or game involving one or more players, including, for example, football, ice hockey, field hockey, polo, volley ball, boxing, etc.

Figure 3:
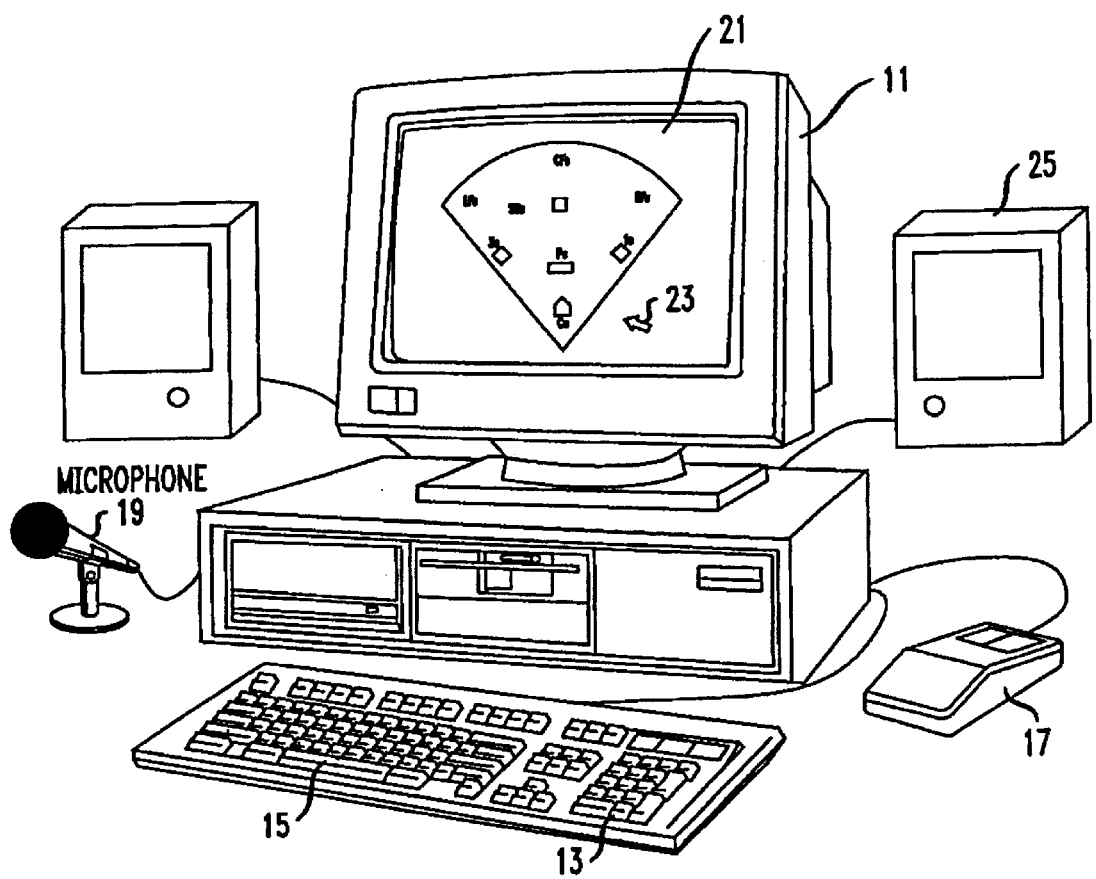
FIG. 3 illustrates user interface apparatus for a master communications device provided in accordance with the invention.

FIG. 3 illustrates a user interface which may be usable by a real coach or assistant coach to keep track of player position and/or select players to receive instructions from a master communications device acting as a virtual coach. FIG. 3 shows a coach computer 11 which includes an associated keyboard input device 15, a mouse type input device 17, display 21, an audio input microphone 19, and audio output speaker 25. Other input/output devices typically associated with a computer may also be employed and, as will be described below, additional input/output devices may also be employed which are not shown in FIG. 3.

Computer 11 includes a display 21 which is capable of displaying a playing field, with a baseball field being shown as exemplary in FIG. 3. Display screen 21 also has a cursor 23 which is movable by keyboard input or mouse 17, or touch screen, and which is convenient to identify and select a player for receiving virtual coaching by the master communications device which includes computer 11.

Figure 4:
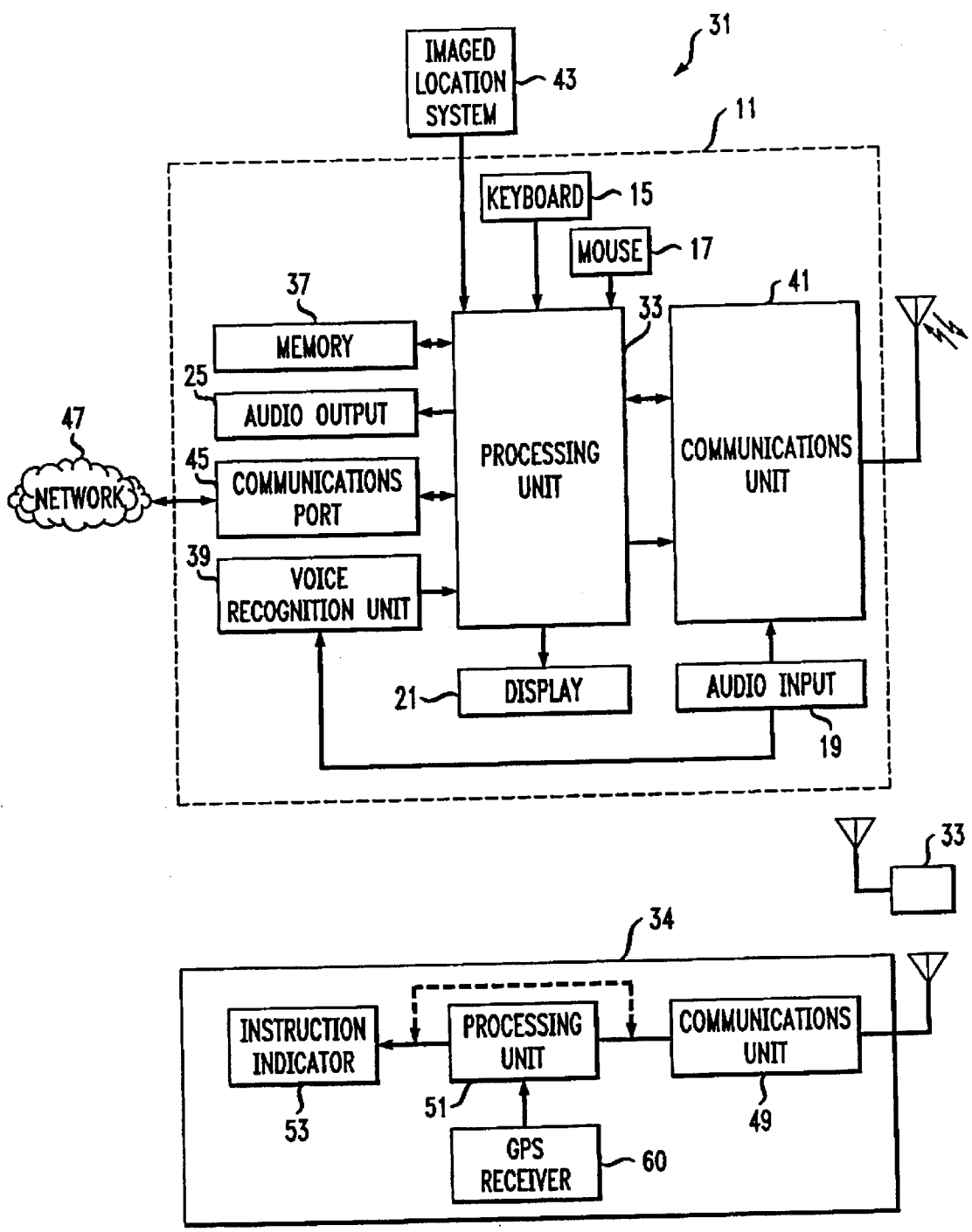
FIG. 4 illustrates in block diagram format the structure of the master communications device and another communications device which may be player wearable.

FIG. 4 illustrates in greater detail the computer 11 and associated input/out devices which collectively form a master communications device 31. The computer 11 includes, in addition to the keyboard 15, mouse 17, audio input 19 and display 21, and audio output 25, a memory 37, a processing unit 33, a communications unit 41, a voice recognition unit 39 for recognizing and processing voice input commands, and a communications port 45. Additional devices which interface with computer 11 include a player and game object (e.g., ball) location system 43, and an external network 47 which may be a LAN base wired and/or wireless network or Internet network.

FIG. 4 also illustrates the player wearable communications devices 34 which include a processing unit 51, a communications unit 49, and an instruction indicator 53. Instruction indicator 53 may provide any type of visual or audible indication to a player which a player will recognize as an instruction to take a particular action. Typically, instruction indicator 53 will be a speaker by which audible coaching instructions can be heard.

As is evident from FIG. 4, processing unit 33 controls all operations which are performed at the master communications device 31, while processing unit 51 controls all operations which occur at the player wearable communications devices 34.

The master communications device 31 is in communication with each of the player wearable communications devices 34 through a wireless link, for example a Bluetooth™ radio link. The master communications unit 31 establishes a separate channel radio link with each available player wearable communications device 34 so that it may individually communicate with one or more players who are wearing the communications devices 34.

As will be described in detail below, the processing unit 33 of the master communications device 31 is capable of formulating and issuing coaching instructions to each of the player wearable communications devices 34 which receive those instructions, process them and send them to the instruction indicator 53. If desired, the player wearable communications device 34 can be simplified to include only a radio receiver and instruction indicator 53 if no processing is required of a received coaching instruction.

Figure 5:
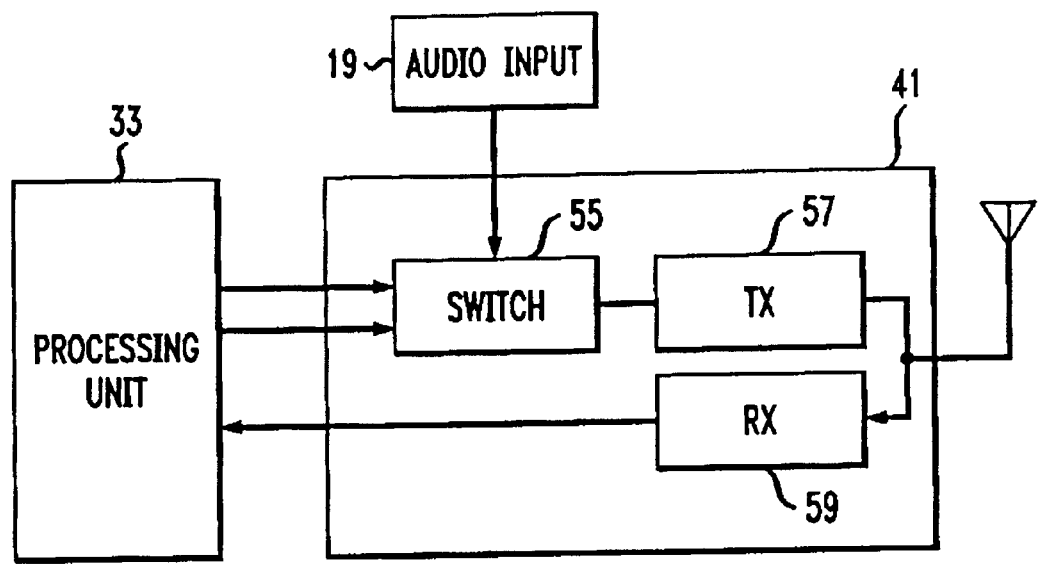
FIG. 5 illustrates in greater detail the master communications device communication unit which is illustrated in FIG. 4.

The master communications device 31, in addition to issuing coaching instructions to individual players based on various input parameters, is also capable of providing a direct audio input from an actual coach to a selected player. FIG. 5 illustrates in somewhat greater detail the communications unit 41 provided in the master communications device 31. It includes both a transmitter 57 and receiver 59 connected in common to an antenna with the input path to transmitter 57 being switchable under control of processing unit 33 and switch 35 to provide either an output from the audio input device 19 to the transmitter 57, or a coaching instruction from the processing unit 33 through switch 55 to the transmitter 57. Thus, the master communications device 31 can selectively interrupt coaching instructions formulated by processing unit 33 and substitute them with actual live audio input from a coach entered through audio input device 19.

Figure 6:
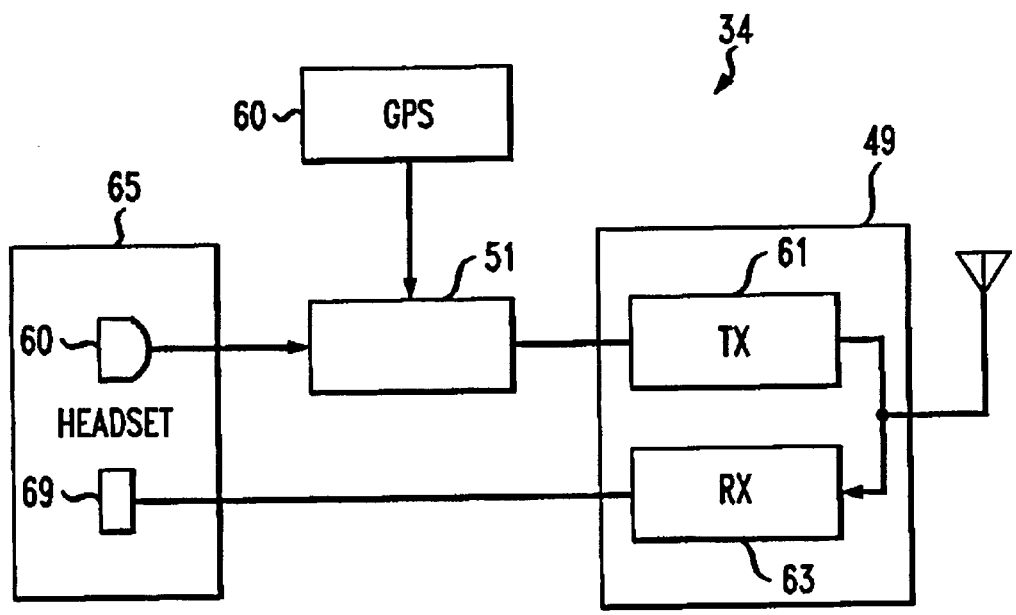
FIG. 6 illustrates in greater detail the communications unit provided in the player communications device illustrated in FIG. 4.

The player wearable communications device 34 is illustrated in somewhat greater detail in FIG. 6. As illustrated in FIG. 6, the player wearable communications device 34 includes a transmitter 61, a receiver 63, both of which are connected to an antenna, and a respective microphone 67 which provides an input to transmitter 61 and a speaker 69 which receives an audio input from receiver 63. The microphone 67 and speaker 69 are preferably provided in a player wearable headset 65. Processing unit 51 controls the communications and other operations at communications device 33 and may also connect with a GPS receiver 60 for transmission of GPS location information from communications device 33 to the master communications device 31. It is also possible to simplify communications devices 33 by eliminating processor unit 51 and GPS receiver 60 and have microphone 67 as a direct input to transmitter 61 and speaker as an output from receiver 63.

Figure 7:
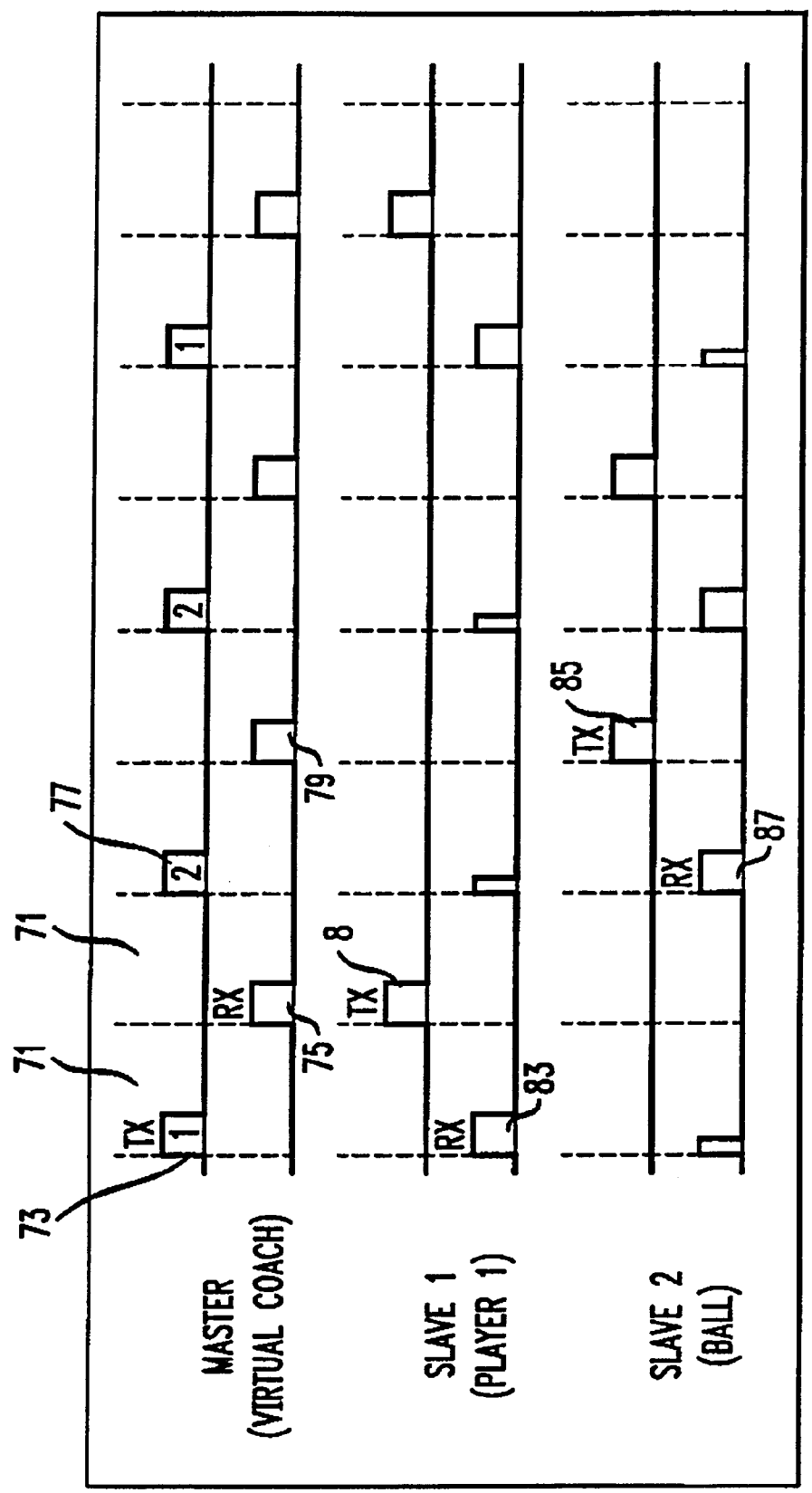
FIG. 7 illustrates a time division multiplex scheme for use and communication between the master communications device and the player communications device illustrated in FIG. 4.

As noted earlier, the master communications device 31 is in communication with each of the player wearable communications devices 34 by a respective wireless channel, for example a radio channel. While the communications channels can be established in any of a variety of ways, one particularly advantageous radio communications scheme is provided in the well-known Bluetooth™ specification. Bluetooth™ allows a multi-slave operation of a master communicator with a plurality of slave communicators by using time slots. Thus, as illustrated in FIG. 7, the Bluetooth™ specification uses a time division duplex protocol to communicate between a master station and each of a plurality of slave stations. Applying such specification to the present invention, the master communications device 31 can communicate with each of a plurality of communications devices 34 through separate time slots 71. For example, as shown in FIG. 7, a master communications device 31 may communicate with a first player wearable communications device 34 using a first time slot 73 for transmission and a subsequent time slot 75 for reception. Likewise, the master communications device 31 may use a subsequent time slot 77 for transmission to a second player and yet a subsequent time slot 79 for reception of a communication from a second player.

In addition to communication with players using such a time division duplex scheme, it is also possible for the master communications station 31 to communicate with a ball or other play object which is also fitted with a communications device 34. Typically, such communications might include a reception from a ball or other game object of communications indicating its current position or location on a playing field. Thus, for example, the communications device 34 of FIG. 6 may omit the head set 65 and processor 51 and simply have a receiver 63 and a GPS receiver 60 coupled to transmitter 61 so that game object location information can be transmitted to the master communications device.

The manner in which a virtual coach configured as a master communications device 31 provides coaching instructions to one or more of the player wearable communications devices 34 will now be described with reference to FIGS. 8–18 which depict in flow chart form operations performed under control of processing unit 33 provided at the master communications device 31.

Figure 8:
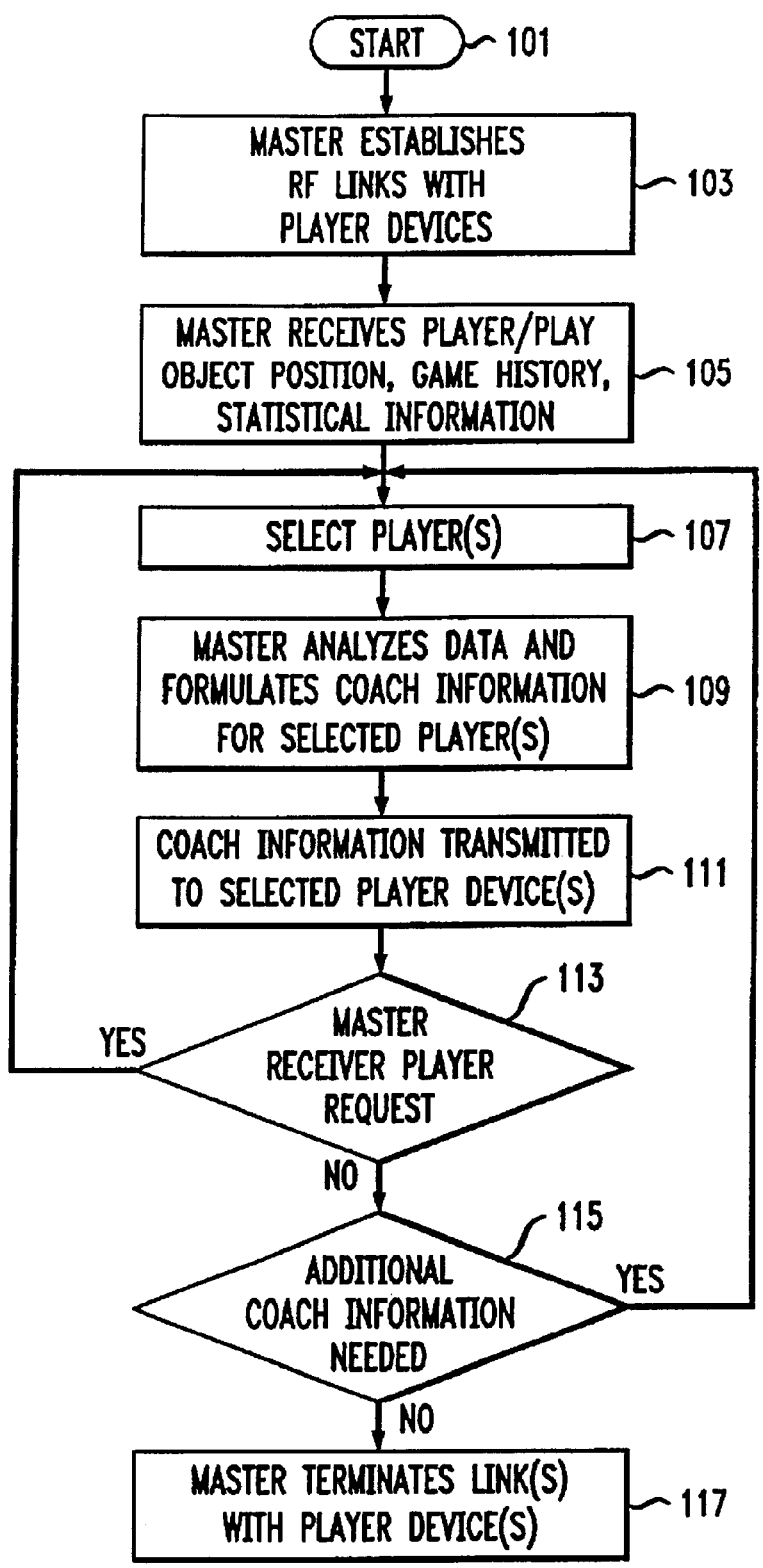
FIG. 8 illustrates in flow chart form the overall operations performed by the master communications device of FIG. 4.

The overall operations performed by processing unit 33 are illustrated in FIG. 8. Beginning at a start processing sequence 101, the master communications device 31 establishes RF links with each of the player (or object containing) communications devices 34 in processing segment 103. Processing unit 33 also receives one or more of player and play object position data, game history data, and statistical information at processing segment 105. The game history may be provided as stored information concerning the history of a particular game to date which may be entered by an operator by one or more of keyboard/mouse input devices 15, 17, or automatically produced by the processing unit 33 in response to previous analysis of game conditions. The statistical information may be provided as a database stored in memory 37 or may be statistical information that is acquired from a network 47 through communications port 45 and stored by processing unit 33 within memory 37.

The player and/or player object location position information can be acquired in a number of different ways. One way is by the use of GPS receivers 60 at each of the communications units 34 provided with the players and/or game play objects. Thus, for example, as shown in FIG. 4, GPS receiver 60 can provide GPS information through communication unit 49 and communication unit 41 to processing unit 33. This will provide the exact position of each of the players and well as the game play object to processing unit 33. Processing unit 33 may then array on a virtual playing field the location of each of the players and/or game objections in the manner shown in the baseball game illustrated in FIG. 3.

Figure 19:
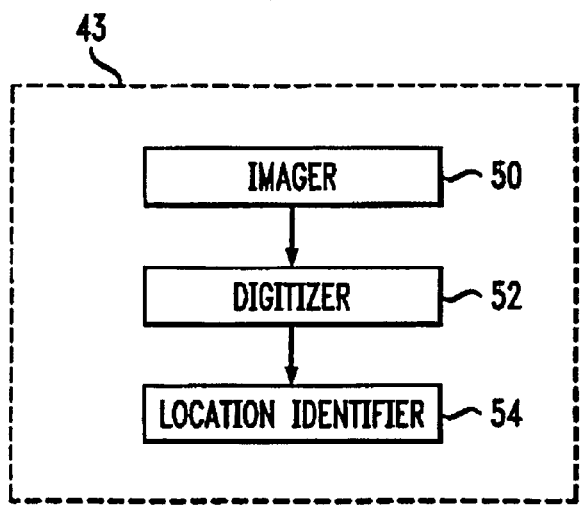
FIG. 19 illustrates an imaging location system which may be used in the invention.

In lieu of a GPS receiver system, an image location system 43 (FIG. 4) may be provided which is connected to processing unit 33. Image location system 43 may be configured as illustrated in greater detail in FIG. 19 as one or more imaging devices 50 which are provided through a digitizer 52 to a location identifier 54. The location identifier 54 is an image analysis device which is capable of identifying from received digitized images the locations of players and/or game objects providing coordinate information concerning such locations to processing unit 33 and identification of a player and/or game object associated with a location.

In lieu of location identifier 54 providing coordinates of the players and/or game object to processing unit 33, the output of digitizer 52 could directly be provided to processing unit 33, which may then perform location identification processing.

Returning to FIG. 8 and processing segment 105, it should be noted that it may not be necessary in all instances to provide player and object position, game history, and statistical information to processing unit 33. For example, an assistant coaching system can be set up in which only statistical information is provided to players, in which case processing segment 105 would only need to receive the statistical information from memory 37 and/or through communications part 45. Likewise, only player and/or object position may be required, or only game history may be required, or any combination of the three inputs. In addition, other inputs may also be provided which would be useful in formulating coaching instructions.

After the processing unit 33 receives the information necessary to formulate coaching instructions in processing segment 105, it next proceeds to select a player or players in processing segment 107, which are to receiving coaching instructions. Once a player or players are selected in processing segment 107, processing unit 33 proceeds to processing segment 109, where it analyzes the available data and formulates a coaching instruction for the player selected in processing segment 107.

It should be noted that in each instance a coaching instruction can include statistical information, actual instructions on how to move or to position a player to place himself, or any other information which would be useful to a player during a practice session or during play of the game.

Following the formulation of a coach instruction in processing segment 109, the formulated instruction is then transmitted to the selected player or players in processing segment 111. This is done by passing the coach instruction from processing unit 33 through the communications unit 41 for transmission to the communications device 34 associated with the selected player or players to receive coaching instructions.

Following this, the processor 33 checks to see if it has received a player request from a communications device 34. This request may be in the form of an oral request from a player for a specific coaching instruction which is received through communications unit 41 and processed by an audio command processor resident within or as an adjunct device to processing unit 33. The audio command processor can be similar in structure to the voice recognition unit 39 which is provided for receiving and processing voice input commands at the master communications device 31.

The player request as recognized at processing segment 113 would also include an identification of the player making the request which is used then to select the player in processing segment 107, following which coaching instructions are formulated and transmitted in processing segments 109 and 111 as described above.

If there is no player request received in processing segment 113, processing unit 33 proceeds to processing segment 115 where it determines whether additional coach information is needed. Additional coach information may be needed, for example, if a game is in progress or if practice session is ongoing, or if by keyboard, mouse or voice command input, or other input, processing unit 33 is instructed that no additional coaching is necessary. If additional coaching information is needed as determined in processing segment 115, processing unit 33 proceeds back to select player processing segment 107 and repeats processing segments 109, 111, 113 and 115 as often as needed. When no additional coaching information is needed, as determined at processing segment 115, processing unit 33 proceeds to step 117 where it terminates the communication link or links with the player devices 34.

Figure 9:
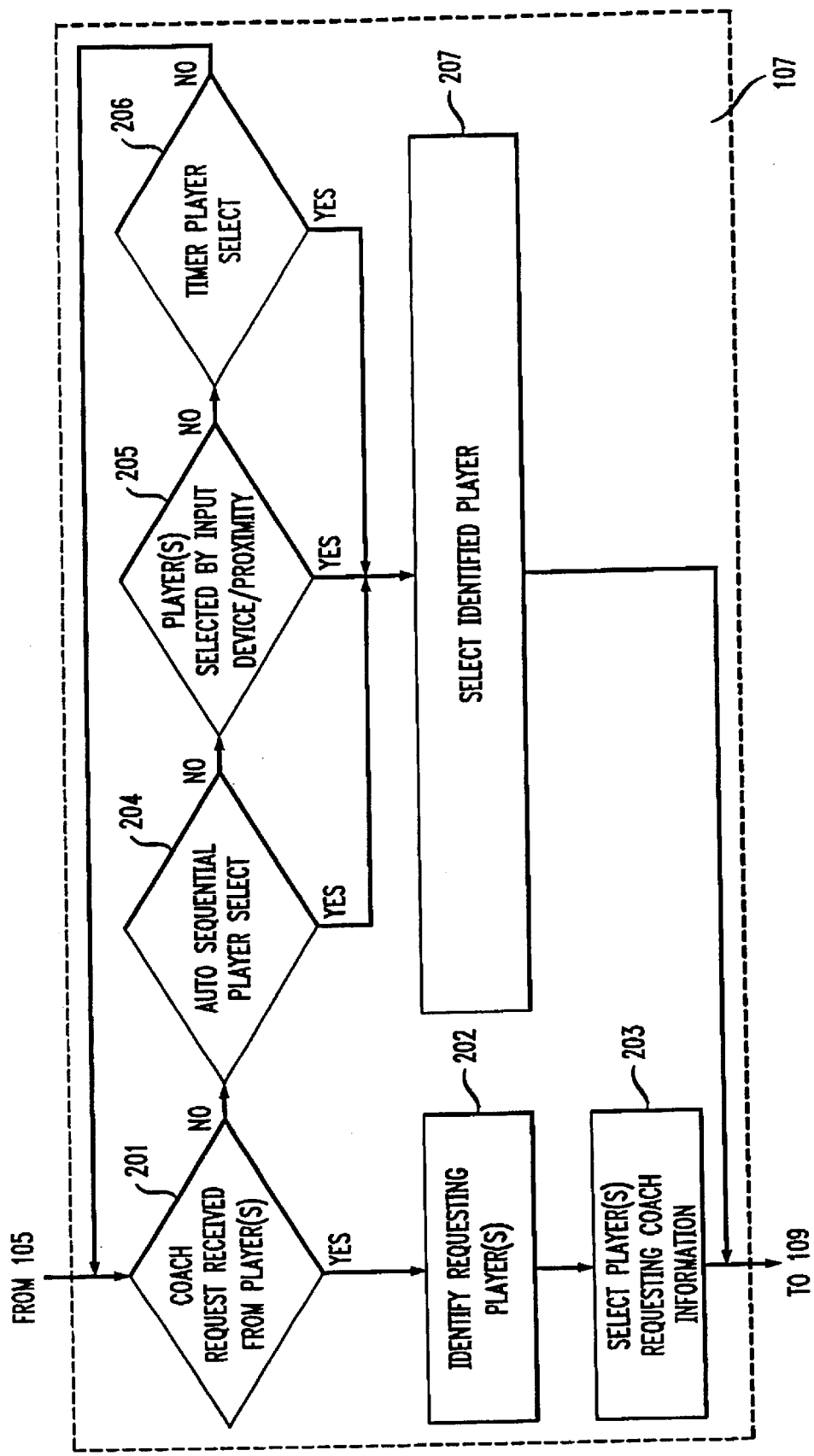
FIG. 9 illustrates in flow chart form a portion of the FIG. 8 processing sequence.

Referring back to the select player(s) processing segment 107 illustrated in FIG. 8, this processing segment is illustrated in greater detail in FIG. 9. If it is determined that a coach instruction request is received from a player in processing segment 201, then the identity of the requesting player is determined in processing segment 202. The player identity is sent with the coaching request from a player to the master communications unit 31. After the requesting player or players are identified, processing unit 33 proceeds to select the players requesting the coaching information in processing segment 203 from which processing proceeds to processing segment 109 in FIG. 8. A player selected for a coaching instruction can also be indicated on display 21. For example, if all players are displayed on display 21, the one(s) selected to receive a coaching instruction can be indicated by highlighting to offset them from the other displayed players.

If no request is received from a player as determined by processing segment 201, then processing unit 33 proceeds to determine in processing segment 204 if the master communications device 31 has been set to automatically sequentially provide coaching instructions to each of the players. An automatic sequential coaching instruction procedure could be selected by either the keyboard 15, mouse 17 voice command through voice recognition device 39, or other selection device associated with processing unit 33.

If an automatic sequential player selection feature is activated, as detected in processing segment 204, then the selected players are identified in processing segment 207 (here, all players are identified in sequential fashion to receive coaching instruction). Again, a selected player can be indicated on display 21. From processing segment 207, processing unit 33 proceeds to processing segment 109 (FIG. 8) where appropriate instructions are formatted for each of the players and sequentially transmitted via processing segment 111 to the players.

Returning to the player selection routine illustrated in FIG. 9, if the auto-sequential player select mode is not selected, processing unit 33 proceeds from processing segment 204 to processing segment 205 where players may be selected by their respective proximity to the master communications device 31. There the master communications device 31 and/or player wearable communications devices 34 may have a limited transmission range, and thus players are selected whose communications devices 34 are in proximity, and thus in RF communication, with the master communications device 31. Once again, this mode may be selected by input from keyboard 15, mouse 17, voice recognition unit 39, etc., to processor unit 33. In the proximity mode, players are selected if they are within a predetermined input proximity to the master communications device 31. Alternatively, players may be selected by their proximity to a particular location on a playing field or to a game object, etc. The player location and game object location information may be obtained, as described above, by either a GPS receiver provided at each of the player and/or play object communications devices 34, by the imaging location system 43 described above, or by entry through an input device, e.g., key board 15, mouse 17, voice recognition unit 39.

If the proximity instruction mode is selected as detected in processing segment 205, then those players which are within a predetermined distance of the master communications device or a predetermined location are selected to receive coaching instructions in processing segment 207, and then coaching instructions are formulated for the selected players and transmitted to them in processing segments 109 and 111 as described above with respect to FIG. 8.

In addition to determining a player based on proximity to a specific location, individual players may also be directly selected at processing segment 205 by an input device, such as keyboard 15, or mouse 17 selection of a player on a display screen, or by voice input to voice recognition device 39.

For example, in FIG. 3 where a baseball environment is illustrated, player selection can be made by an operator moving cursor 23 by way of mouse 17 over a specific player shown on the display 21. By clicking on a displayed player, this would select the player for receiving a coaching instruction. An operator may select one or more players using this methodology. If this selection is employed as detected in processing segment 205, the one or more players selected are identified in processing segment 207, and those players then receive coaching instructions by way of processing segments 109 and 111 in FIG. 8.

If the direct input or proximity mode feature is not selected as determined at processing segment 205 by processing unit 33, then a processing unit 33 determines whether a timer select mode has been activated in processing segment 206. The timer select mode provides a preset schedule of times at which different players are provided associated coaching instructions. For example, a timer select mode may be configured such that player 1 receives instructions for five minutes, followed by player 6 which receives instructions for five minutes, followed by player 4, which receives instructions for the next seven minutes, etc.

When in the timer mode, processing unit 33 determines which players receive instructions by comparing a current time to a scheduled time for player instructions. Thus, when the timer player select mode is selected as determined at processing segment 206, processing unit 33 selects the player designated by the current time to receive an instruction in processing segment 207, and then that player or players receive their instructions and have the instructions transmitted in processing segments 109 and 111 as described above with respect to FIG. 8.

If in processing segment 206 a timer mode was not selected, the process returns to await an instruction for one of the player requests, sequential player select, player select by input device and/or proximity or timer player select mode.

Once again, any players which are selected in processing segment 207 (or 203) can be indicated as selected on display 21 by processing unit 33.

Figure 10:
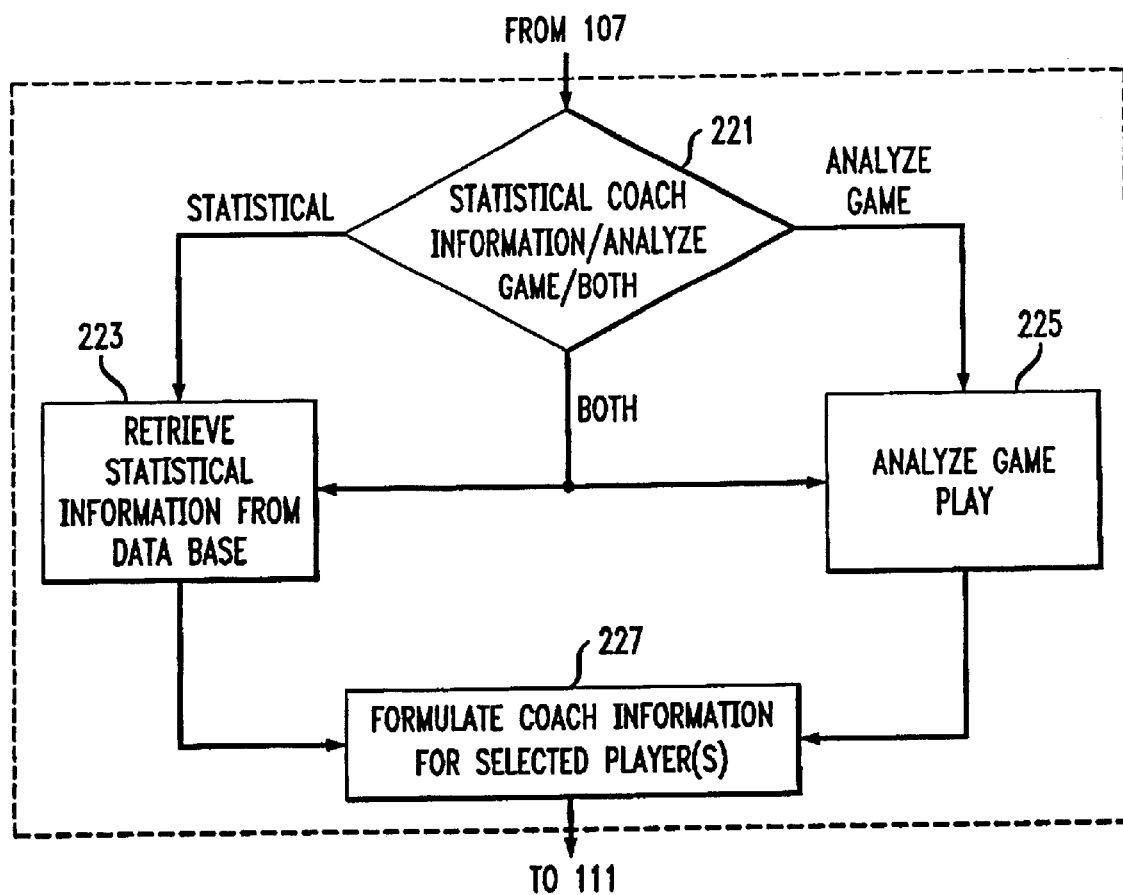
FIG. 10 illustrates in flow chart form another portion of the FIG. 8 processing sequence.
Figure 11:
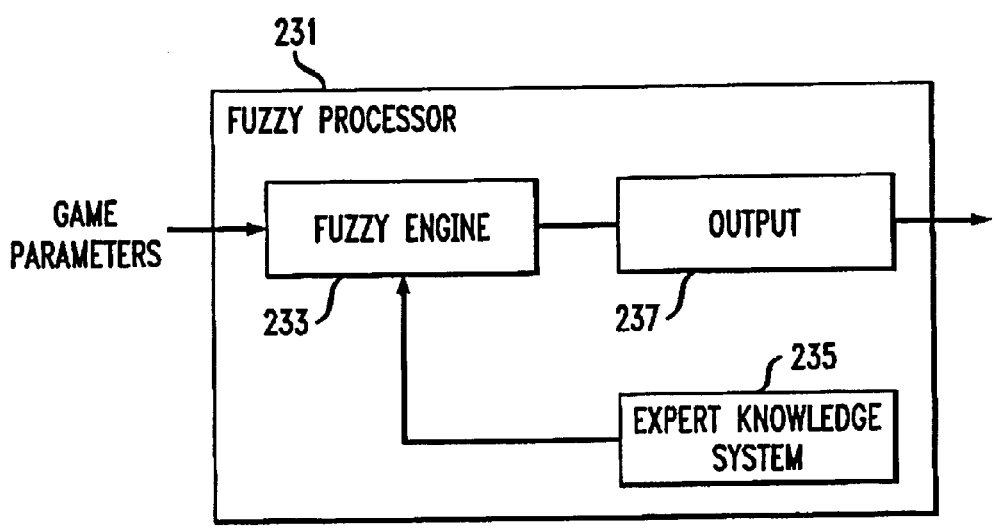
FIG. 11 illustrates an exemplary processing module which can be employed by the master station communications device processing unit illustrated in FIG. 4.

Processing segment 109 illustrated in FIG. 8 which formulates a coaching instruction is illustrated in greater detail by the processing routine shown in FIG. 10. An initial inquiry is made in processing segment 229 as to whether statistical coaching information or analytical game coaching information, or both, is to be supplied to a particular previously selected player. This again can be selected by user input at either keyboard 15, mouse 17, by voice command through voice recognition device 39 or other type of user input, to processing unit 33. If a statistical selection is made as detected in processing segment 221, statistical information which is to be conveyed to the identified or selected player is retrieved from a database and formulated as a coaching instruction in processing segment 227 for that selected player or players.

If in processing segment 221 processing unit 33 determines that analytical game information is required, that game information is provided at processing segment 225 where particular conditions of the game or practice session are analyzed by processing unit 33 and provided to processing segment 227, where it is formulated as a coaching instruction for the selected player. If both statistical and analytical game coaching instruction are required as determined as processing segment 221, then both processing segments 223 and 225 are employed to provide both statistical information and analytical game or play information to processing segment 227 where such information is formulated as a coaching instruction to an identified player.

The analytical game play information determined at processing segment 225 may be performed by any one of a number of analytical software modules which may be provided, depending on the type of game and/or coaching level which is desired. Various computer analysis tools can be employed to pick an appropriate coaching instruction for a given set of game conditions and/or player locations. These can be preset by an actual coach into the memory 37 so that processing unit 33 can determine a particular game situation and look up in memory 37 associated coaching instructions for various players for the particular situation and issue those instructions to selected players. Processing unit 33 may also employ fuzzy a logic processing module 231 of the type shown in FIG. 11 which employs a fuzzy engine 233 and an expert knowledge system 235 in the form of applicable processing rules to produce an output at output circuit 237, or other artificial intelligence type processing, if desired, in formulating the instructions in processing segment 225. Some exemplary scenarios for formulating coaching instructions will be described below with reference to FIGS. 13–15.

Figure 12:
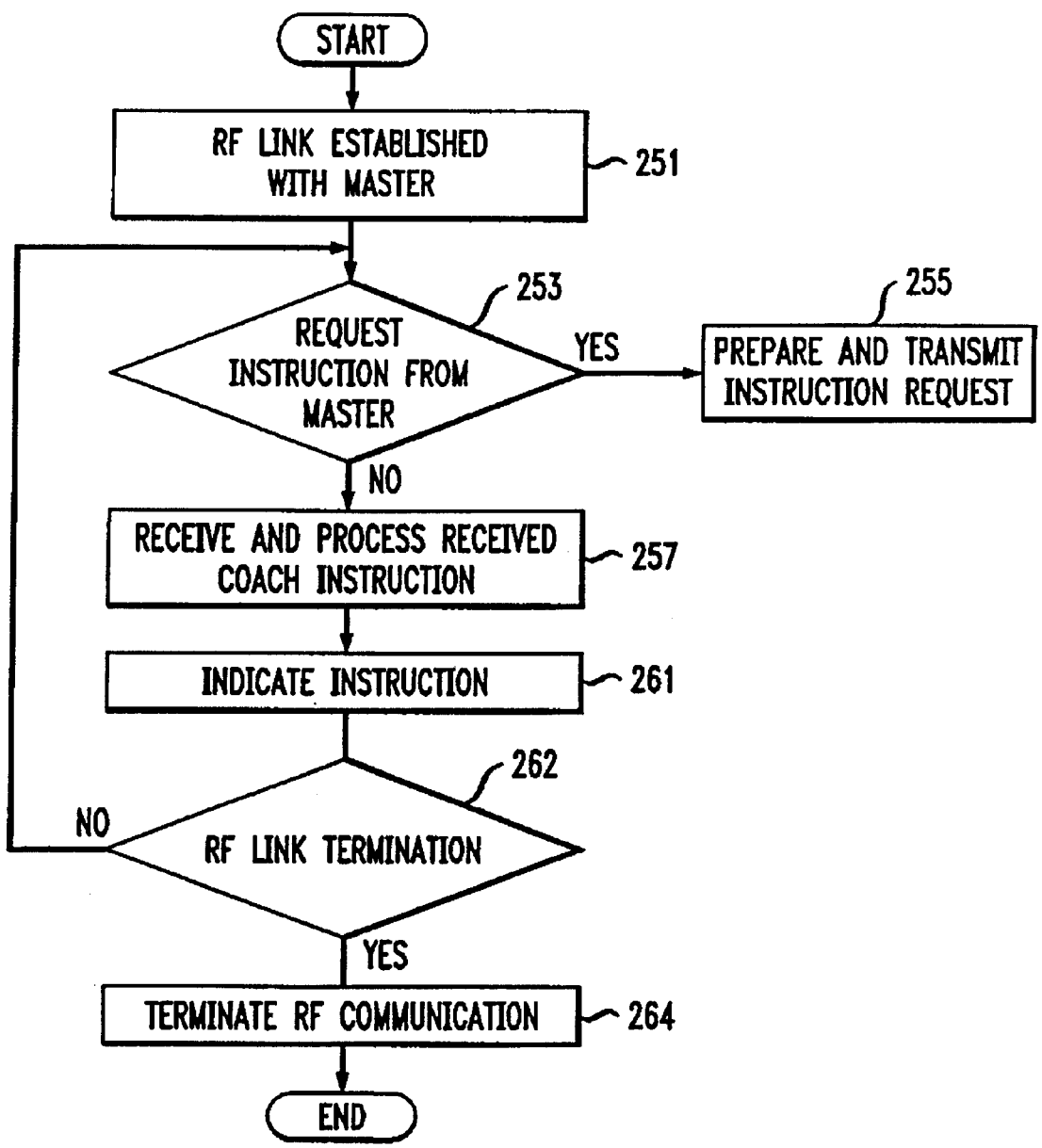
FIG. 12 illustrates processing operations performed at the player communications device.

FIG. 12 illustrates the processing employed at processing unit 51, if used, within a communication device 34. Beginning in processing segment 251, an RF link is established with the master communications device 31. Following this, processing unit 51 determines whether there is a request by the player for a coaching instruction from the master communications unit 31. If there is a player request, processing unit 51 proceeds to processing segment 255 where it prepares and transmits an instruction request to the master communications device 31. Processing segment 255 may employ a voice command analysis where a specific coaching request is analyzed and encoded as a specific instruction request, or processing segment 255 may be as simple as passing an audio request from microphone 67 through to transmitter 61 as an audio request to the master communications 31.

From processing segment 255, processing unit 51 proceeds to processing segment 257 where it receives and processes any received coach instruction, and from there to processing segment 261, where any received coaching instruction is indicated. Indication may be by any typical indication device, such as a display device, a vibration or coded vibration, or an audible signal which is indicated by instruction indicator 53. As noted earlier, instruction indicator 53 may be in the form of a speaker 69 provided at a headset unit 65 in which an audio instruction is conveyed to a player.

Once an instruction has been indicated, e.g., audibly presented to a player, at processing segment 261, processing unit 51 proceeds to processing segment 262 where it determines if an RF link needs to be terminated. This would be indicated by an instruction from the master communications device 31 that an RF link needs to be terminated or put into a low power mode, park or hold. If no instruction is received, then processing unit 51 proceeds back to processing segment 253, where it repeats the processing described above from that processing segment.

If in processing segment 253 no such player requests are received, then the processing unit 51 proceeds directly to processing segment 257 where it receives and processes any received coaching instructions, and from there indicates such instructions in processing segment 261.

If in processing segment 262 it is indicated that an RF link is to be terminated, then that termination is performed at processing segment 264, following which processing ends.

Figure 13:
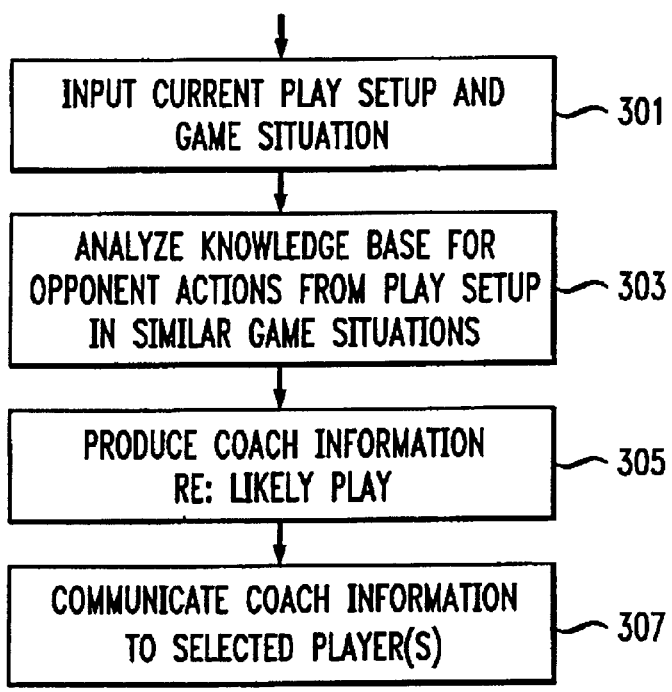
FIG. 13 illustrates another portion of the processing routine executed by the master station processing unit shown in FIG. 4.

As noted earlier, many different scenarios are possible for providing coaching instructions based on various game conditions and/or player locations which exist at the time of use of the master communications device 31. FIG. 13 illustrates one such coaching instruction formulation.

In FIG. 13, in processing segment 301, a current play setup and game situation are input. The game situation can include game parameters. For example, for a baseball game, the game situation may include what inning, what out, what the current count is to the batter, and the score. The current play setup information may include who the batter is, who the pitcher is, player and/or game object locations and other game setup information. From this information, processing unit 33 proceeds to analyze a knowledge base of how an opponent player or team reacts in the situation and sets up input at processing segment 301. For example, in a baseball game, if a batter is being coached, processing unit 33 may utilize a lookup table to look up based on the parameters input in processing segment 301, what types of pitches a pitcher will likely throw under the current game situation. This knowledge base may be historical data compiled from prior games or from other sources.

Based on what a pitcher usually will throw under similar game situations, a coaching instruction is then formulated in processing segment 305 and communicated in processing segment 307. It should be noted that processing segments 301 corresponds to processing segment 105 in FIG. 8, while processing segments 303 and 305 in FIG. 13 correspond to processing segment 109 in FIG. 8, and processing segment 307 corresponds to processing segment 111 in FIG. 8.

Figure 14:
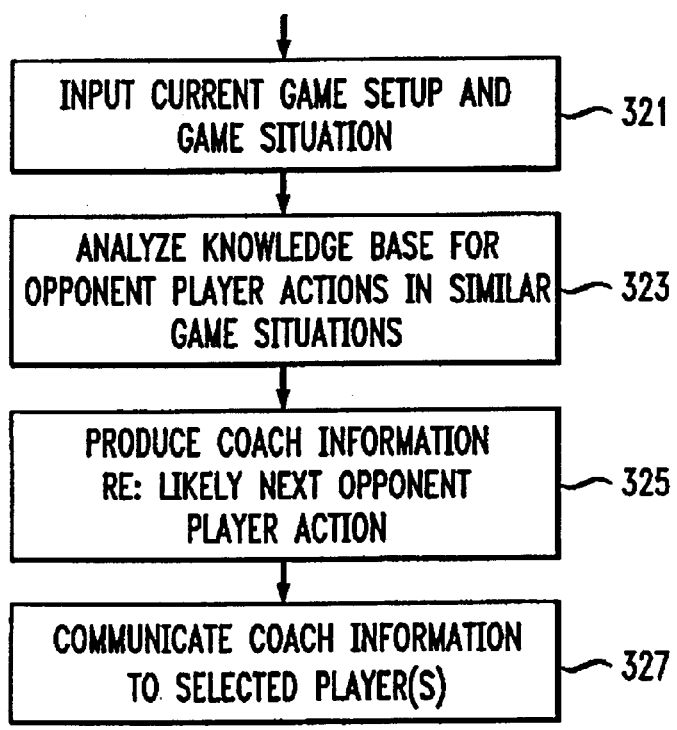
FIG. 14 illustrates another portion of the processing routine executed by the master station processing unit illustrated in FIG. 4.

FIG. 14 illustrates another possible scenario for producing a coaching instruction. Once again, in processing segment 321 current play setup and game situation information are input in processing segment 321. This time, in processing segment 323, a knowledge base is consulted to see how a particular player should act in similar game situations. This information is then used to produce a coach instruction regarding how a player should act in processing segment 325, and once again this is transmitted as a coaching instruction in processing segment 327 to a selected player or players.

Figure 15:
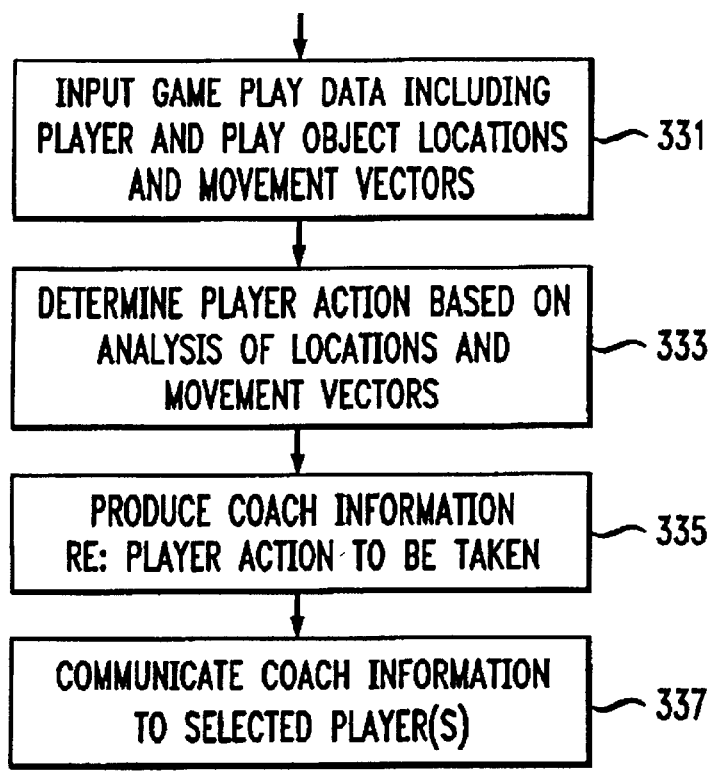
FIG. 15 illustrates another portion of the processing routine executed by the master station processing unit of FIG. 4.

FIG. 15 illustrates another possible coaching instruction which may be formulated in accordance with the invention. Once again, in processing segment 331, current play setup and game situation information, including player and game object locations, and movement factors based on recent position information, is input in processing segment 331. Based on the input information data, including player and play object locations and movement vectors, a player action can be determined based on the analysis of the object locations and movement vectors in processing segment 333.

As an example, if the input game data is for a baseball game and it indicates that a ball has been hit to the short stop location, and there is a player on first base, processing unit 33 would analyze this as a potential double play situation and instruct a second baseman to move towards second base to receive a throw from the short stop for a possible double play. Processing unit 33 may also instruct a first baseman to anticipate a throw from the second baseman in such a situation. In any event, the information as analyzed in processing segment 333 is formulated as a coach instruction in processing segment 335, and it is again communicated to the player in processing segment 337.

While a few examples of potential coaching situations and instructions have been described and illustrated above, it should be noted that these are only exemplary of the many types of game or practice session conditions, situations and instructions which may be employed with the present invention. The invention is not limited to any particular type of game or coaching instruction.

Figure 16:
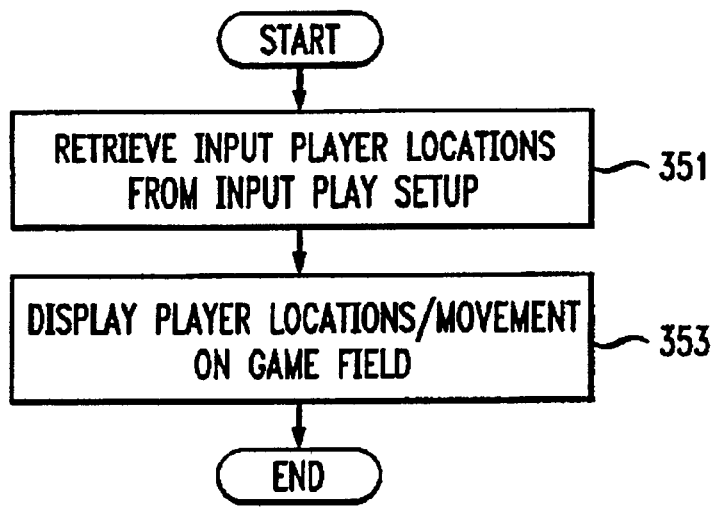
FIG. 16 illustrates another portion of the processing routine executed by the master station processing unit of FIG. 4.

As noted earlier, processing unit 33 may also provide on display 21 the relative locations of players in a game and/or a play object. The player locations and/or object locations can be input by way of GPS receivers 60 as described above, or by way of an image location system 43, also described above. This information may be used for player selection or to assist a real coach in observing the locations and/or movements of players under various game or practice session conditions. This is illustrated in FIG. 16.

As shown, processing segment 351 is executed by processing unit 33 to retrieve the input player and/or object locations from the location system 43 and/or GPS location receivers 60. Processing unit 33 determines a player location and/or movements relative to a displayable game field and displays player and/or game object locations on the playing field. Thus, progress of a game can be monitored on a display unit 31, and player selections may be made as described above. In addition, if a request for a coaching instruction is received from a player, as detected in processing segment 201, the displayed requesting player at processing segment 353 can be highlighted to show on display 21 which of the displayed players is asking for and receiving a coaching instruction.

Figure 17:
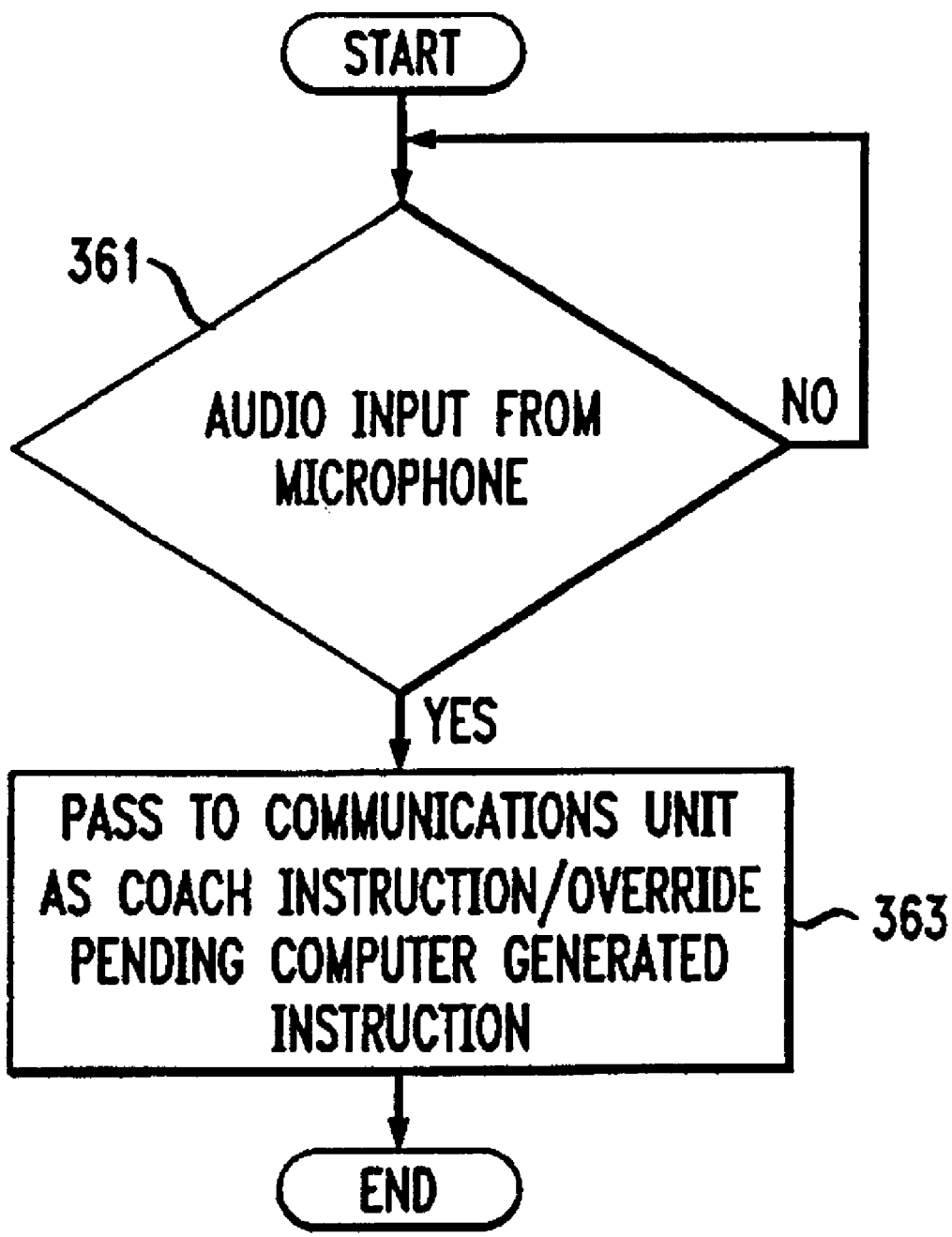
FIG. 17 illustrates another portion of the processing routine executed by the master station processing unit of FIG. 4.
Figure 18:
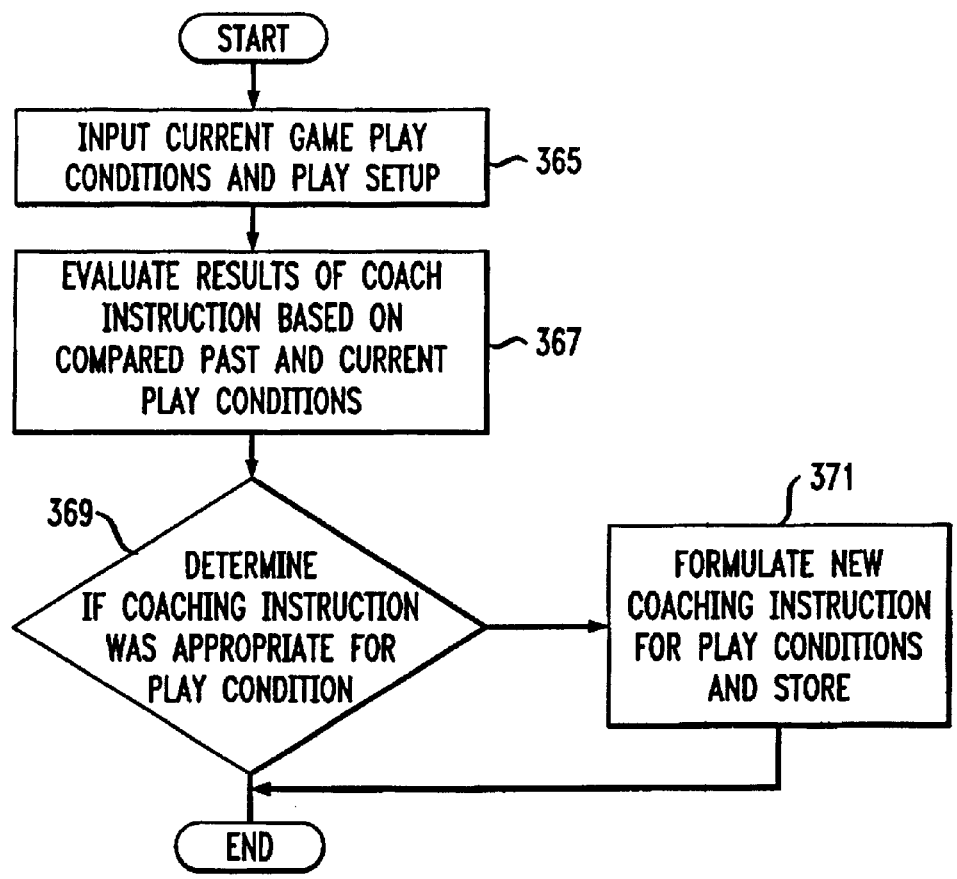
FIG. 18 illustrates another portion of the processing route executed by the master station processing unit of FIG. 4.

FIG. 17 illustrates a situation where an audio coaching instruction may be provided to a player in addition to or as an override of an automated instruction furnished by processing unit 33. Processing unit 33 monitors an audio input device such as microphone 19, and if an audio input is detected in processing segment 361, processing unit 33 then passes this communication directly as a coaching instruction to communications unit 41 for transmission to a communications unit 33. Thus processing unit 33 controls switch 55 (FIG. 5) to interrupt communication from the processing unit 33 through transmitter 57 to a communications unit and instead substitute an audio input from, for example, a microphone 19 input to the transmitter 57 for communication directly to a communications device 33.

It should be further noted that an audio input 19 through microphone or other source can also be used as an input command device to processing unit 33 for player selection or other input commands by connecting the audio input device 19 through a voice recognition unit 39, which recognizes voice commands and provides those commands as inputs to processing unit 33.

The master communications device 31 can also be provided with an auto learning function for refining its ability to generate coaching commands in response to specific game condition, player locations and other information. This learning function is illustrated in the processing routine shown in FIG. 18.

In processing segment 365, current play setup and game conditions are input to an analysis processing segment 367. In processing segment 367, the results of the current game play conditions and play setup are compared with previous game play conditions and set up before a coaching command was produced. If the proper conditions resulted, as input at processing segment 365, this is determined in processing segment 369. Thus, if the coaching instruction was appropriate and produced the appropriate play conditions as determined at processing segment 367, then no change in coaching instruction for similar game play condition and/or player setup is needed for future coaching instructions. On the other hand, if it is determined that a particular coaching instruction did not produce a desired result as determined at processing segment 369, then a new coaching instruction for particular play conditions and/or setups may be produced and stored in processing segment 371.

As described above, the present invention provides a virtual coach employing a master communication device 31 which communicates with one or more slave communication devices 34 which are typically player wearable devices and/or communications devices which can be played on game objects such as game balls.

Coaching instructions can be provided from the master communications device 31 to selected player wearable communication devices 34 to instruct a player on how to proceed in a given situation. Thus, more players can receive more instruction without requiring specific attention of an actual coach and their individual performance in a game or practice session environment can be more quickly improved.

While the invention has been described and illustrated using specific examples of structure, communications protocols, and exemplary sports games, it should be noted that many modifications and substitutions can be made without departing from the spirit and scope of the invention. Accordingly, the invention is not to be considered as limited by the foregoing description, but is only to be considered as limited by the scope of the appended claims.

What is claimed as new and desired to be protected by Letters Patent of the United States is:

1. A communications system for remotely coaching a game player, said system comprising:
   a plurality of player associated communications devices, each communications device associated with a respective player and comprising at least a receiver and a device for indicating a received coaching instruction to a player;
   a master communications device for wirelessly communicating with said plurality of player associated communications device, said master communications device comprising at least a transmitter for transmitting a coaching instruction to said receiver and a processing unit for processing information associated with game play, said processing unit causing said transmitter to transmit a coaching instruction based on said game play information to said at least one player associated communications device;
   a display device coupled to said processing unit for displaying indications of game players; and
   wherein each said player associated communications device includes a transmitter for transmitting player comments to said master communications device, said master communications device further comprising a receiver for receiving said player comments and a player identification device for identifying a player making comments.

2. A communications system as in claim 1 wherein said processing unit is responsive to an identification of a player by said player identification device to cause an indication associated with a commenting player on said display to change relative to the indications associated with other players.

3. A communications system for remotely coaching a game player, said system comprising:
   at least one communications device associated with a player and comprising at least a receiver and a device for indicating a received coaching instruction to a player;
   a master communications device for wirelessly communicating with said at least one player associated communications device, said master communications device comprising at least a transmitter for transmitting a coaching instruction to said receiver and a processing unit for processing information associated with game play, said processing unit causing said transmitter to transmit a coaching instruction based on said game play information to said at least one player associated communications device;
   a location system for locating a plurality of players and a game object, and a display, said processing unit receiving player and game object position information from said location system and operating said display to display player and game object position; and a proximity detector for determining when said master communications device is within a predetermined distance of a player, said proximity detector controlling a selection of which of said player associated communications devices will receive said coaching instruction.

4. A master communications device for communicating coaching instructions to a game player, said device comprising:
   a communications unit for conducting wireless communications;
   a processor unit for receiving information concerning the play of a game, and for producing game player coaching instruction based on said received information, said processor unit causing said communications unit to wirelessly transmit said coaching instructions to a game player;
   a display coupled to said processing unit, said processing unit receiving information on the position of players, said processing unit causing said display to display the positions of said players relative to a game area; and
   a player selection device for selecting at least one player wearable communication device for communications with said master communications device.

5. A master communications device for communicating coaching instructions to a game player, said device comprising:
   a communications unit for conducting wireless communications;
   a processor unit for receiving information concerning the play of a game, and for producing game player coaching instruction based on said received information, said processor unit causing said communications unit to wirelessly transmit said coaching instructions to a game player;
   a display device coupled to said processor unit for displaying indications of game players; and
   a receiver for receiving a player message and a player identification device for identifying a player associated with the player message.

6. A master communication device as in claim 5 wherein said processor unit is responsive to an identification of a player by said player identification device to cause an indication associated with said player message on said display to change relative to the indications associated with other players.

7. A master communications device for communicating coaching instructions to a game player, said device comprising:
   a communications unit for conducting wireless communications;
   a processor unit for receiving information concerning the play of a game, and for producing game player coaching instruction based on said received information, said processor unit causing said communications unit to wirelessly transmit said coaching instructions to a game player;
   a proximity detector for determining when said master communications device is within a predetermined distance of a player, said proximity detector controlling a selection of which player said coaching instruction is transmitted to; and
   wherein said processor unit receives player and game object position information and operates said display to display player and game object positions.

* * * * *